3,749,558
NICKEL-COATED STEEL CORE WIRES
AND CABLES
Jean-Paul Dillenschneider, Beaumont, France, assignor to
 Compagnie Generale des Etablissements Michelin,
 raison sociale Michelin & Cie, Clermont-Ferrant (Puy-
 de-Dome), France
Filed Feb. 8, 1971, Ser. No. 113,448
Claims priority, application France, Feb. 12, 1970,
7005091
Int. Cl. B60c 9/12
U.S. Cl. 29—191.6                                10 Claims

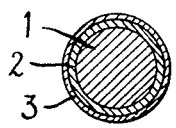
FIG. 1
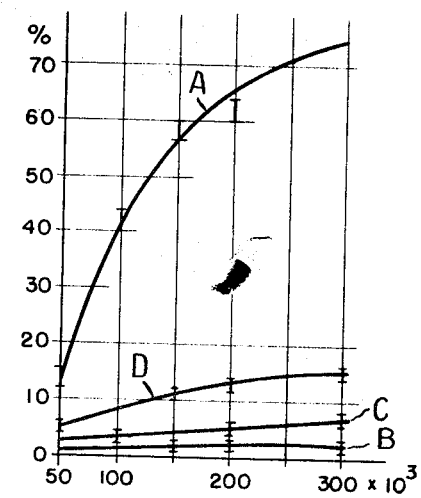
FIG. 2
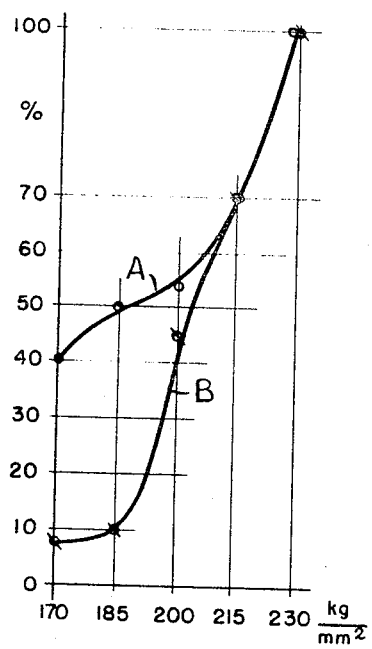
FIG. 3
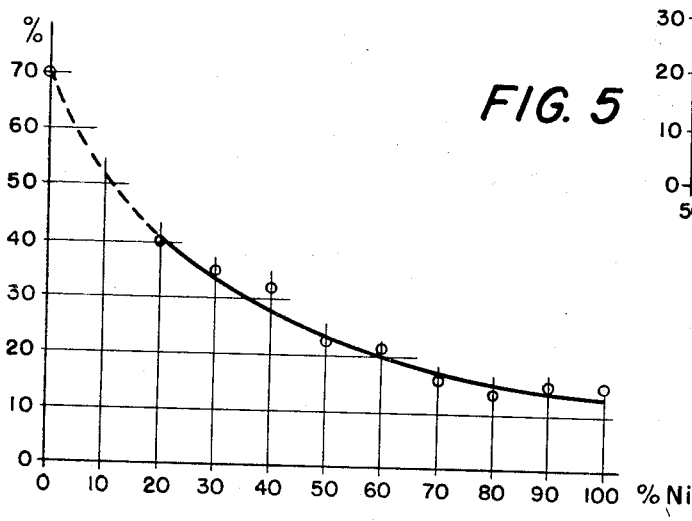
FIG. 5
FIG. 6
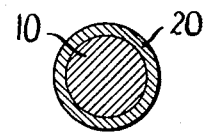
FIG. 4
INVENTOR.
JEAN-PAUL DILLENSCHNEIDER United States Patent Office 3,749,558
Patented July 31, 1973

ABSTRACT OF THE DISCLOSURE

Wires and cables which are particularly useful in reinforcing rubber articles, such as tires, have a work-hardened nickel-containing coating upon a steel core.

---

The present invention relates to wires and cables intended for the manufacture of tires or any other articles of reinforced rubber. It relates, on the one hand, by way of industrial products, to wires, as well as cables and other assemblies of individual wires made therefrom, and, on the other hand, to a method of manufacturing the wires.

The cables used to make the reinforcement of tires are made by means of very thin wires having a steel core coated with a coating of a nonferrous metal or alloy. This coating consists of a very thin layer of a thickness of about 0.1 or 0.2 micron, of copper, zinc or, most frequently, brass. It assures a two-fold function. First of all, it facilitates the drawing of the wire to the very small diameter, between about 0.08 and about 0.40 mm., and, most frequently, between about 0.15 and about 0.26 mm., which is necessary to produce strong, flexible cables such as the cables serving to reinforce tires. Second of all, it assures the adherence of the wires and cables to the base rubber mix in which these wires and cables are encased, as a result of transformations which occur upon the vulcanization of the rubber.

Under certain circumstances, wires of brass-coated steel core exhibit disturbing deficiencies and inadequacies. The brass coating, as a matter of fact, assures only insufficient protection of the steel core when the wires are placed or subjected to stresses in a corrosive or even slightly corrosive medium, as laboratory tests and observations on tires have shown.

Thus brass-coated steel core wires or cables incorporated in testpieces of vulcanized rubber which are placed in water of 55° C. containing 0.5% salt exhibit rather rapidly a static corrosion of the steel and a loss of adherence between the metal and the rubber. The degree of corrosion and of loss of adherence depends, of course, on the length of time that the testpieces are in the salt water. The phenomenon is, however, sufficiently intense and rapid for the effect to be harmful in only a few hours. Microscopic examination furthermore shows that the corrosion of the steel and the loss of adherence to the rubber are merely different aspects of the same phenomenon; it is the corrosion of the steel which causes the separation of the steel core and the brass coating and therefore the loss of adherence of the steel to the rubber.

Another observation, which is even more striking, is the following: A brass-coated steel core cable subjected to cyclic mechanical stresses has its life substantially decreased as a function of an increase in the relative humidity of the surrounding air. A relative humidity of only 30% produces a noticeable effect. At 60% relative humidity, which is a common value, a considerable statistical reduction in the life of the wires and cables of brass-coated steel is noted, the percentage of broken wires for a given number of cycles being very significantly higher than in the case of a test in perfectly dry air. This is undoubtedly a fatigue-corrosion phenomenon. The ruptures of brass-coated steel core wires for a given number of cycles, which breaks are more numerous the higher the humidity, are characteristic fatigue ruptures—flat ruptures, without constriction of the metal at the point of rupture. They may be accompanied by visible signs of corrosion such as the presence of metallic oxides when the number of cycles is very high.

The observations made in the laboratory are confirmed by direct observations on tires reinforced with brass-coated steel core wires and cables. In a tire, as a matter of fact, the reinforcement wires or cables are never completely isolated from the outside environment. The rubber which coats and surrounds them is never perfectly air-tight and may furthermore be the object of cuts or cracks caused by the more or less severe conditions of use. There are actually noted in tires breaks of brass-coated steel core wires which are fatigue breaks and are accompanied by signs of corrosion.

It would appear obviously desirable to increase the resistance to corrosion and to fatigue corrosion of the individual steel core wires constituting the reinforcement cables of the tires. One could then expect an improvement in the life of the tires, particularly when they are used in corrosive environments or simply in countries in which the air is frequently laden or even saturated with moisture.

The present invention is directed at improving the resistance to static corrosion and to fatigue corrosion of steel core wires as well as the permanence of the steel-rubber bond in the case in particular of very thin wires of the type used to make cables and assemblies intended for the reinforcement of tires and other articles of reinforced rubber. For this purpose the invention provides for coating the steel core of wires with a coating of special new type and to do so by a special method.

The wire of the invention comprises a steel core with a work-hardened nickel-containing coating thereon, the nickel content of the coating being from about 20% to 100%, and usually from about 60% to about 80%, by weight of the coating. Thus the coating is either nickel metal or a nickel alloy.

In accordance with the special provisions of the invention:

(a) The nickel alloy contains copper as the principal alloy element associated with the nickel; it may, but need not, contain other metals such as tin, cobalt and zinc;

(b) The nickel alloy coating is placed directly on the steel core; however, one can provide between the steel core and the nickel or nickel alloy coating an intermediate layer of another metal or alloy of high melting point (above 900 or 1000° C.) such as, for instance, a layer of copper;

(c) The nickel or nickel alloy coating may, but need not, be coated with a layer of a metal, in particular copper, or of an alloy, in particular brass, to improve the adherence of the wire to the rubber. When the steel core of the wire is coated with a layer of pure nickel, this layer is preferably itself coated with a layer of brass;

(d) The thickness of the layer of nickel or of nickel-base alloy coating is between about $\frac{1}{50}$ and about $\frac{1}{5000}$ and preferably between about $\frac{1}{200}$ and about $\frac{1}{1000}$ of the diameter of the wire; the amount of nickel or of nickel alloy is thus preferably from about 0.5% to about 2.5% of the weight of the wire.

As has been indicated, the nickel or nickel-base alloy coating of the steel core of the wire must be work-hardened. This point is particularly important for various reasons.

First of all, while it is theoretically possible to coat a very thin wire core with a metallic deposit, this operation would not be satisfactory either from a technical viewpoint or from an economic viewpoint. From a technical viewpoint, the low mechanical strength of the wire core due to its small diameter makes the coating operations difficult (breaks of wire, irregular thickness of deposit, etc.). From an economic point of view, the production capacity of a coating line would be very small and the operation would therefore be very expensive in view of the possible speeds of passage of the wire. For this reason it is advisable to effect the coating on a wire core of relatively large diameter, for instance between about 0.5 and about 2 mm. or else of the order of 1 mm., and then to proceed to the drawing which causes the work-hardening of the nickel metal or nickel alloy forming the coating.

Second of all, the work-hardening of the layer of nickel or nickel-base alloy due to better compactness improves the resistance to the penetration of corrosive agents down to the level of the steel core, particularly when the wire is subjected to variable stresses. Experience shows that the layer of work-hardened nickel or work-hardened nickel-base alloy effectively protects the steel core. A steel core wire in accordance with the invention shows substantial improvements in its resistance to static corrosion in acid medium, in the retention of its adherence to rubber and in particular in its life under fatigue corrosion.

Finally, the coatings contemplated, whether single or multiple, facilitate, in the same way as copper or brass, the drawing of the steel core wires and constitute a metal layer which is favorable for the adherence of the steel core wires to the rubber.

The process of the invention for manufacturing wires of steel core coated with a layer of nickel or nickel-base alloy, such as a nickel-copper alloy, comprises the following steps: transforming in the cold a bare or coated steel wire stock to a suitable diameter (3 to 8 times the final wire diameter desired), patenting treatment, coating the wire core and drawing the coated wire core to the final wire diameter. The depositing of the nickel-containing coating is effected before the drawing step in order to use the coating like a flowing ring and work-harden it during the drawing step.

The depositing of nickel can be effected either before or simultaneously with or after the depositing of copper. When the two metals are deposited separately, the nickel-copper alloy can be obtained by diffusion at high temperature (700 to 1000° C.) of two distinct layers of copper and nickel which have, for instance, been deposited electrolytically, and this diffusion can be effected upon a patenting treatment. The two metals, or at least one of them, can be deposited before a heat patenting treatment, as a matter of fact, the melting points of copper and nickel and the solidus temperature of copper-nickel alloys are higher than that of the patenting treatment, which is obviously not true of copper-zinc alloys.

The deposit of nickel on a bare steel core or a steel core previously coated with copper can be effected electrolytically. For this purpose one can use a nickel sulfate-chloride bath at a temperature of 35° C. to 70° C. in which the wire is circulated by producing a current density of 2 to 15 amperes per square decimeter, or a nickel sulfamate bath at a temperature of 55° C. to 70° C., the current density being 5 to 60 amperes per square decimeter.

The copper can also be deposited electrolytically, in particular by means of a copper cyanide or copper tartrate bath, as is well known. It is possible to deposit the copper and nickel simultaneously, for instance by means of a bath containing, for instance, nickel and copper thiosulfate.

The weight amount of nickel to be deposited is preferably close to 1% of that of the wire, and more generally between about 0.5% and about 2.5% of that of the wire; preferably furthermore the weight proportions of nickel and copper for producing the nickel-copper alloy are from about 60% to about 80% nickel and from about 40% to about 20% copper, respectively. As is known, nickel and copper are miscible in all proportions to form single-phase alloys crystallizing in the cubic face-centered system.

In order to produce a wire with a steel core coated with a layer of nickel (or of nickel alloy) which in turn is coated with a layer of brass, one can, after the depositing of the layer of nickel (or nickel alloy) and before drawing, deposit two successive layers of copper and zinc and proceed with a copper-zinc thermal diffusion to obtain brass by heating at a temperature of about 450° C. In this case the copper does not, for all practical purposes, diffuse into the nickel or nickel alloy, and one obtains two separate layers, one having a base of nickel and the other of brass.

The advantages of the invention will be evident from an examination of the examples and tests described below.

EXAMPLE 1

A drawn core wire of hard steel of 0.7% carbon is manufactured with a diameter of 0.95 mm. by the customary technique. The wire is then cleaned and then patented in a reductive atmosphere, which imparts to it a clean, oxide-free surface and makes it suitable to be drawn again. It is then given successive coatings by passage through various baths, the sequence of the operations comprising:

(a) Passage of the wire through an electrolytic degreasing bath having a base of sodium carbonate;

(b) Passage of the wire through a pickling bath having a base of sulfuric and hydrochloric acids;

(c) Passage through an electrolytic nickel coating bath. There is used a nickel sulfamate bath containing 480 g./liter of nickel sulfamate and 30 g./liter of boric acid. The pH is about 5.5. The cathodic current density is 20 amperes per square decimeter. The coating time of stay is about 45 seconds;

(d) Rinsing the wire in running water;

(e) Passage through an electrolytic copper coating bath. A copper tartrate bath is used which contains 100 g./liter of tartaric acid, 150 g./liter of soda and 50 g./liter of copper tartrate. The cathodic current density is 3 amperes per square decimeter. The coating time is about 80 seconds;

(f) Rinsing the wire in running water;

(g) Passage through an electrolytic zinc coating bath. A bath containing 100 g./liter of zinc sulfate is used. The cathodic density is 4 amperes per square decimeter. The coating time is 35 seconds;

(h) Rinsing in running water.

The wire which is thus coated with three successive layers of nickel, copper and zinc is then heated to effect the copper-zinc thermal diffusion. A Joule-effect heating is used, the wire being brought to a temperature of about 450° C. for a few seconds. This treatment does not affect the layer of nickel but transforms the layers of copper and zinc into brass.

The drawing of the coated wire is then effected by the wet method in order to bring it, by passage through a set of dies, to a diameter of 0.18 mm. The wire which has thus been finished comprises, on a steel core, a work-hardened coating of nickel of about 900 mg. of nickel to 100 g. of wire, this nickel coating being itself coated with a layer of brass of about 70% copper of 400 mg. to 100 g. of wire.

FIG. 1 shows, on a very large scale, a cross-section through the wire obtained, showing the steel core 1, the work-hardened nickel coating 2 and the brass coating 3, the thicknesses of the coatings being exaggerated as compared with the diameter of the steel core 1.

FIG. 2 shows fatigue corrosion tests carried out on the one hand on wires of a steel core coated with nickel and brass, such as those which have just been described in this example, and on the other hand, wires differing from the preceding wires only by the absence of the nickel coating. A number of wires of the two types were subjected to a fatigue test by repeated bending at 20° C. in a wet atmosphere of 60% relative humidity. The stress applied is 170 kg./mm.²

The curves of FIG. 2 give the percentage of broken wires as a function of the number of bending cycles.

Curve A relates to wires of a steel core coated solely with brass. Curve B relates to wires of a steel core coated with nickel and then brass. Curves C and D relate to wires of a steel core coated with nickel and then brass which have been prepared in slightly different manner, using nickel sulfate-chloride nickel coating baths.

As can be noted, the presence of nickel spectacularly increases the life of the wires. At the end of 150,000 bending cycles the wires which are simply brass-coated show more than 50% break and the nickel-coated wires less than 10% break. This result is a statistical result referring to a large number of wires tested, which eliminates any possibility of accidental error.

FIG. 3 gives the percentage of breaks of wires for a constant number of cycles (100,000) as a function of the bending stress applied. As in the case of FIG. 2, the test is carried out in air at 20° C. containing 60% relative humidity. Curve A also relates to simply brass-coated wires and curve B to wires coated with nickel and brass as described above.

A comparison of curves A and B shows that the superiority of the nickel-coated wires is more marked the lower the stress. The percentages of breaks are the same for very high stresses.

The following table shows, on the other hand, the different behavior of cables of wires with steel cores which have simply been brass-coated and cables of wires with steel cores coated with nickel and brass in cable-separation tests. The cables used consist of 7 strands of 3 wires of 0.18 mm. diameter. They were bonded to rubber by inclusion in testpieces of raw rubber and then by vulcanization of the rubber. The testpieces were immersed in salt water containing 0.5% salt maintained at a temperature of 55° C. The force necessary to obtain separation of the cable and rubber was measured at periodic intervals. The results of the measurements are given in the following table:

|  | Brass-coated wire, kg. | Nickel and brass-coated wire, kg. |
| --- | --- | --- |
| Tearing force: | | |
| Initially | 79 | 85 |
| After 24 hours | 46 | 54 |
| After 48 hours | 33 | 44 |
| After 72 hours | 25 | 42 |
| After 96 hours | 20 | 42 |

In both cases the force necessary to tear the cable undergoes a decrease after immersion in hot salt water. However, the decrease is always less in the case of the nickel-coated steel core wire and in particular it becomes stabilized at a level which is still acceptable.

EXAMPLE 2

As in Example 1, one starts from a drawn steel core wire having a diameter of 0.95 mm. It is subjected to the following operations:

(a) Passage through an electrolytic degreasing bath,
(b) Passage through a pickling bath,
(c) Passage through an electrolytic nickel coating bath, as in Example 1, these operations, however, being carried out before patenting of the wire.

After depositing of the nickel and copper coatings, the thermal copper-nickel diffusion and the patenting of the steel core wire are effected simultaneously by heating in a reductive atmosphere at a temperature of 930° C.

There is thus obtained a patented steel wire core coated with a nickel-copper alloy. The drawing is then effected by wet method to bring the wire to a diameter of 0.18 mm.

The finished wire comprises, on a steel core, a work-hardened coating of a nickel-copper alloy containing 70% nickel, this coating comprising about 1200 mg. of alloy to 100 g. of wire.

FIG. 4 shows a cross-section through such a wire comprising a core 10 of steel and a coating 20 of nickel-copper alloy.

FIG. 5 gives the break percentage of wires in fatigue corrosion in air at 20° C. and 60% relative humidity on the one hand for known brass-coated steel core wires and on the other hand for steel core wires coated with a nickel-copper alloy as described above. Curve A relates to brass-coated steel corew ires and curve B to steel core wires coated with nickel-copper alloy. Here also the presence of nickel alloyed with copper results in a considerable increase in the life.

Similar tests related to steel core wires coated with nickel-copper alloys of various thicknesses and compositions. In the case of an alloy having a 70% nickel content, a very substantial improvement in the life is obtained even with only a thickness corresponding to a coating of about 500 mg. to 100 g. of wire. It is preferable, however, to use a double or triple thickness. Beyond this, the additional improvement does not, it would seem, justify the increase in the amount of nickel used.

FIG. 6 shows the influence of the nickel content of the nickel-copper alloy on the life. The curve gives the percentage of breaks as a function of the nickel content after 250,000 cycles in air of 20° C. and 60% relative humidity. The presence of 20% nickel by itself produces a substantial improvement as compared with steel core wire the coating of which does not contain nickel (ordinary brass-coated steel core wire). The optimum region seems to be from about 60% to 80% nickel. Beyond this there does not seem to be any significant improvement. Between 20% and 60% nickel the life varies in the same direction as the nickel content. The use of a nickel-copper alloy thus makes it possible to improve the resistance to fatigue corrosion at a cost far less than that resulting from the use of a layer of pure nickel coated, for instance, with a layer of brass.

Thin wires of steel core having a coating containing nickel in accordance with the invention lend themselves well to the manufacture of metal cables intended for the reinforcement of tires. They impart to the tires characteristics of increased resistance to fatigue phenomena and prolong the life thereof.

What is claimed is:

1. In a rubber-adherable tire reinforcement wire having a very thin diameter of from about 0.08 to about 0.40 millimeter and having a hard carbon steel core coated with a nonferrous metallic coating, the improvement which comprises said nonferrous metallic coating being a work-hardened nickel coating covered by a brass outer coating, whereby said wire has improved resistance to static corrosion and fatigue corrosion under moist conditions.

2. The wire as defined by claim 1 wherein the work-hardened nickel coating is directly upon the hard carbon steel core.

3. The wire as defined by claim 1 wherein an intermediate layer of another metal or alloy of high melting point above 900° C. is between the work-hardened nickel coating and the hard carbon steel core.

4. The wire as defined by claim 1 wherein the diameter of the wire is from about 0.15 to about 0.26 millimeter.

5. The wire as defined by claim 1 wherein the work-hardened nickel coating has a thickness of between about 1/50 and about 1/5000 of the diameter of the wire.

6. The wire as defined by claim 1 wherein the work-hardened nickel coating has a thickness of between about 1/200 to about 1/1000 of the diameter of the wire.

7. The wire as defined in claim 1 wherein the amount of nickel in the work-hardened nickel coating is between about 0.5% and about 2.5% of the weight of the wire.

8. A cable formed of a plurality of the wires defined by claim 1.

8. A cable formed of a plurality of the wires defined by claim 2.

10. A cable formed of a plurality of the wires defined by claim 3.

References Cited

UNITED STATES PATENTS

| | | | |
|---|---|---|---|
| 3,490,125 | 1/1970 | Frieling, Jr. | 29—196.3 X |
| 2,002,263 | 5/1935 | Domm | 29—195 EX |
| 2,490,700 | 12/1949 | Nachtman | 29—196.3 X |
| 2,420,291 | 5/1947 | Adler | 29—196.3 X |
| 3,389,991 | 6/1968 | Tanczyn | 75—126 R |
| 3,455,681 | 7/1969 | Moskowitz et al. | 75—126 R |
| 3,507,711 | 4/1970 | Fisher | 29—183.5 X |

ALLEN B. CURTIS, Primary Examiner

U.S. Cl. X.R.

29—196.3, 195